United States Patent
Irie

(10) Patent No.: US 7,251,510 B2
(45) Date of Patent: Jul. 31, 2007

(54) WIRELESS COMMUNICATION TERMINAL AND MOBILE TYPE WIRELESS COMMUNICATION TERMINAL

(75) Inventor: Michio Irie, Nagano (JP)

(73) Assignee: Seiko Epson Corporation (JP)

( * ) Notice: Subject to any disclaimer, the term of this patent is extended or adjusted under 35 U.S.C. 154(b) by 44 days.

(21) Appl. No.: 11/159,045

(22) Filed: Jun. 22, 2005

(65) Prior Publication Data

US 2005/0288073 A1    Dec. 29, 2005

(30) Foreign Application Priority Data

Jun. 25, 2004    (JP)    ............... 2004-188349

(51) Int. Cl.
*H04Q 7/32*    (2006.01)
(52) U.S. Cl. ............... 455/575.1; 455/550.1; 455/575.3; 455/572; 455/90.3; 455/557; 455/575.4; 379/433.01; 379/433.11; 379/428.01
(58) Field of Classification Search ............ 455/575.1, 455/550.1, 575.3, 575.4, 575.6, 574, 572, 455/556.1, 557, 556.2, 90.1, 90.2, 90.3, 73, 455/343.1, 343.2, 343.4, 343.5, 522, 569, 455/500, 517, 422.1, 403; 379/433.01, 433.11, 379/428.01
See application file for complete search history.

(56) References Cited

U.S. PATENT DOCUMENTS

| | | | |
|---|---|---|---|
| 6,115,618 A * | 9/2000 | Lebby et al. | 455/566 |
| 6,192,230 B1 * | 2/2001 | van Bokhorst et al. | 455/343.3 |
| 6,748,196 B2 * | 6/2004 | Lee et al. | 455/69 |
| 6,892,082 B2 * | 5/2005 | Boesen | 455/575.3 |
| 7,050,829 B2 * | 5/2006 | Motohashi | 455/556.1 |
| 2004/0043799 A1 * | 3/2004 | Ishibashi et al. | 455/575.1 |

FOREIGN PATENT DOCUMENTS

| | | |
|---|---|---|
| JP | 08-140138 | 5/1996 |
| JP | 2000-138522 | 5/2000 |
| JP | 2001-217627 | 8/2001 |
| JP | 2001-285424 | 10/2001 |
| JP | 2001-345756 | 12/2001 |
| JP | 2002-217800 | 8/2002 |
| JP | 2002-354086 | 12/2002 |
| JP | 2003-507954 | 2/2003 |
| JP | 2003-243917 | 8/2003 |
| JP | 2004-166005 | 6/2004 |

OTHER PUBLICATIONS

Communication from PCT re: related application.

* cited by examiner

*Primary Examiner*—Keith Ferguson
(74) *Attorney, Agent, or Firm*—Harness, Dickey & Pierce, P.L.C.

(57) ABSTRACT

A wireless communication terminal includes first and second case members coupled together by a coupling portion so that the positional relation therebetween can be changed, an external wireless communication antenna provided at the first case member, an external wireless communication control portion mainly controlling external wireless communication carried out through the external wireless communication antenna, a first internal wireless communication antenna, a first internal wireless communication control portion controlling internal wireless communication carried out through the first internal wireless communication antenna, a display part provided at the second case member, a second internal wireless communication antenna, a second internal wireless communication control portion controlling internal wireless communication carried out through the second internal wireless communication antenna, and an output power control portion controlling the output power of waves transmitted by the internal wireless communication based on the timing of transmitting waves transmitted through the external wireless communication antenna.

10 Claims, 10 Drawing Sheets

FIG. 6A  TDMA time slots
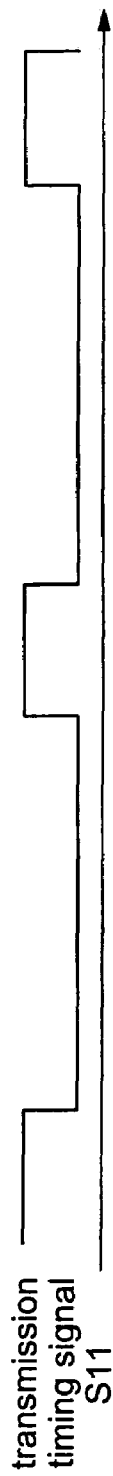
FIG. 6B  transmission timing signal S11
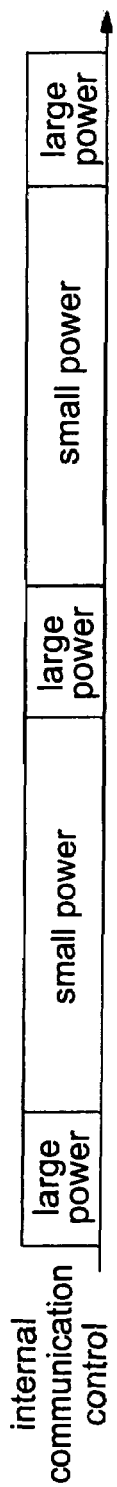
FIG. 6C  internal communication control

WIRELESS COMMUNICATION TERMINAL AND MOBILE TYPE WIRELESS COMMUNICATION TERMINAL

RELATED APPLICATIONS

This application claims priority to Japanese Patent Application No. 2004-188349 filed Jun. 25, 2004 which is hereby expressly incorporated by reference herein in its entirety.

BACKGROUND OF THE INVENTION

1. Technical Field

The present invention relates to a wireless type communication terminal and a mobile type wireless communication terminal, and is particularly applicable to a clamshell type mobile telephone and the like.

2. Related Art

In recent years, there have been attempts to increase the resolution of liquid crystal displays in the mobile telephones so that still pictures or moving images taken by the digital cameras can be displayed with higher definition in addition to normal still images such as characters and graphics. This increases data quantities exchanged between a digital camera and a liquid crystal display and the use of LVDS (Low Voltage Differential Signaling), a high speed transfer system for connection with a display part or an image sensing device has been proposed.

Recent mobile telephone handsets mostly employ the clamshell design because its foldable structure allows the mobile telephones to have a larger display size while their portability is not impaired and the design can prevent operation buttons from being accidentally pressed while the users carry the handsets around. The clamshell design has a first case member including a control portion that mainly controls the external wireless communication function of the mobile telephone and a second case member having a display part. The first and second case members are hinged together and can be opened and closed through the hinge.

However, as the resolution of the display part placed in the mobile telephone increases, the number of pins in a flexible wiring board used for sending signals to the display part must be increased to transmit high bit rate image data or the like to the display part through a wire. Therefore, in a mobile telephone handset with a clamshell design, the flexible wiring board with an increased number of pins must be passed through the hinge to allow the data transmission between the first and second case members through a wire, which complicates the hinge structure or the packaging process. This is not only an obstacle to reduce the size of the mobile telephone handset, but also pushes up the cost, and the reliability can be lowered.

Meanwhile, instead of the flexible wiring board, an internal wireless communication antenna may be provided in each of the first and second case members, so that data transmission between the first and second case members can be carried out by internal wireless communication. In this case, the communication suffers from interference with wireless communication outside the mobile telephone. Therefore, the environment for the internal wireless communication changes depending on the wireless communication outside the mobile telephone, and the reliability in surely transmitting data can be deteriorated.

When a wireless communication method operating with low limited output by UWB (Ultra Wide Band) is employed for the internal wireless communication in particular, the power level is greatly different from the waves output by the wireless communication outside the mobile telephone, and the power level difference could be as large as 90 dB.

Therefore, the effect of even a signal outside the band of interest upon the internal wireless communication could not be ignored, the interference with the wireless communication outside the mobile telephone degrades the wireless communication environment, the bit error rate increases and retransmission caused by increase in the packet error rate could be increased.

According to a method disclosed by Japanese Patent Publication No. 2003-507954, a branch unit to branch a part of a transmission signal in a stage before the antenna is provided so that a very weak GPS signal can be received while transmission is carried out by the mobile communication. A branch signal from the branch unit is attenuated or phase-shifted to produce an interference compensation signal, and the interference compensation signal is superposed on the GPS signal.

According to the method disclosed by Japanese Patent Publication No. 2003-507954, the branch unit, an attenuator, a phase shifter and a superposing unit are necessary. A complicated and large-scale circuit configuration is necessary, and the cost, size, and weight are increased.

SUMMARY

An advantage of the invention is to provide a wireless communication terminal and a mobile wireless communication terminal that allow the communication environment to be changed by external wireless communication and reduce the deterioration in the quality of the internal wireless communication between first and second case members.

To attain the above-described advantage, a wireless communication terminal according to one aspect of the invention includes a first case member, a second case member coupled with the first case member, a coupling portion that couples the first and second case members so that the positional relation between the first and second case members can be changed, an external wireless communication antenna provided at the first case member, an external wireless communication control portion that mainly controls external wireless communication carried out through the external wireless communication antenna, a first internal wireless communication antenna, a first internal wireless communication control portion that controls internal wireless communication carried out through the first internal wireless communication antenna, a display part provided at the second case member, a second internal wireless communication antenna, a second internal wireless communication control portion that controls internal wireless communication carried out through the second internal wireless communication antenna, and an output power control portion that controls the output power of waves transmitted by the internal wireless communication antennas based on the timing of transmitting waves transmitted through the external wireless communication antenna.

In this way, the transmission power of the internal wireless communication carried out between the first and second case members can be controlled depending on the power handled by the external wireless communication. Therefore, while the effect of the internal wireless communication upon the quality of the external wireless communication is reduced, the internal wireless communication can be carried out. If the effect of interference by the external wireless communication is great, the deterioration in the quality of the internal wireless communication can be reduced. Therefore, the communication quality both in the external and internal wireless communication can be secured, while data transmission between the first and second case members can be carried out wirelessly. Consequently, even if the data transmission quantity between the first and second case members increases, the positional relation between the first and second case members can be changed without complicating the structure of the coupling portion. Therefore, the size of the wireless communication terminal can be reduced and the reliability can be improved while an increase in cost is kept low. In addition, the wireless communication terminal may have a larger screen and can carry out an increased number of functions while the portability of the wireless communication terminal is not impaired.

A wireless communication terminal according to another aspect of the invention includes a first case member, a second case member, a coupling portion that couples the first and second case members so that the positional relation between the first and second case members can be changed, an external wireless communication antenna provided at the first case member, an external wireless communication control portion that mainly controls external wireless communication carried out through the external wireless communication antenna, a first internal wireless communication antenna, a first internal wireless communication control portion that controls internal wireless communication carried out through the first internal wireless communication antenna, a display part provided at the second case member, a second internal wireless communication antenna, a second internal wireless communication control portion that controls internal wireless communication carried out through the second internal wireless communication antenna, a carrier detecting portion that detects the output level of waves transmitted from the external wireless communication antenna, and an output power control portion that controls the output power of waves transmitted from at least one of the first and second internal wireless communication antennas based on the output level detected by the carrier detecting portion.

In this way, the output level of waves transmitted through the external wireless communication antenna can be directly monitored, and it can be determined whether or not the waves are transmitted through the external wireless communication antenna. Therefore, according to the transmission timing for external wireless communication, the transmission power of the internal wireless communication can be controlled, and the cost can be prevented from increasing, the size of the wireless communication terminal can be reduced, and the reliability of the terminal can be improved. Meanwhile, the screen size at the wireless communication terminal can be increased and the number of functions carried out by the terminal can be increased while the portability of the terminal is not impaired.

According to another aspect of the invention, the output power control portion sets the transmission power of the internal wireless communication carried out at the time of transmission by the external wireless communication to be larger than the transmission power of the internal wireless communication carried out at the receiving time by the external wireless communication.

In this way, when the power handled by the external wireless communication is large, the transmission power of the internal wireless communication can be increased. At the receiving time by the external wireless communication, the transmission power of the internal wireless communication can be reduced. Therefore, while the deterioration in the quality of the internal wireless communication can be reduced, the transmission operation by the external wireless communication can be carried out. In addition, the internal wireless communication can be carried out without affecting the receiving operation by the external wireless communication.

A wireless communication terminal according to yet another aspect of the invention includes a first case member, a second case member, a coupling portion that couples the first and second case members so that the positional relation between the first and second case members can be changed, an external wireless communication antenna provided at the first case member, an external wireless communication control portion that mainly controls external wireless communication carried out through the external wireless communication antenna, a first internal wireless communication antenna, a first internal wireless communication control portion that controls internal wireless communication carried out through the first internal wireless communication antenna, a display part provided at the second case member, a second internal wireless communication antenna, a second internal wireless communication control portion that controls internal wireless communication carried out through the second internal wireless communication antenna, a communication environment detecting portion that detects a communication environment based on a signal received through the external wireless communication antenna, a first output power control portion that controls the output power of waves transmitted from the external wireless communication antenna based on the communication environment detected by the communication environment detecting portion, and a second output power control portion that controls the output power of waves transmitted from at least one of the first and second internal wireless communication antennas based on the result of the control by the first output power control portion.

In this way, the transmission power of the external wireless communication can be controlled based on the communication environment, while the transmission power of the internal wireless communication can be increased based on the transmission power of the external wireless communication. In this way, the deterioration in the quality of the internal wireless communication can be reduced while the quality of the external wireless communication can be improved.

According to yet another aspect of the invention, the wireless communication terminal is a mobile telephone.

Therefore, when a clamshell design is employed for the mobile telephone, the data transmission between the case members of the mobile telephone can be wirelessly and stably carried out. In this way, even if the quantity of data exchanged between the first and second case members increases to cope with a display part with higher resolution provided in the mobile telephone, the structure of the coupling portion and the packaging process can be prevented from being complicated. Consequently, the size of the wireless communication terminal can be reduced and the reliability of the terminal can be improved while an increase in cost is kept low. In addition, the size of the screen of the mobile telephone and the number of functions carried out by the telephone can be increased while the portability of the telephone is not impaired.

According to a still further aspect of the invention, the internal wireless communication is very weak radio or close range radio by UWB radio.

In this way, while the output level of the internal wireless communication is reduced, the internal wireless communication can be carried out stably. Therefore, if the quantity of data transmission between the first and second case members increases, the data transmission between them can be carried out wirelessly within legal restrictions, and therefore the positional relation between the first and second case members can be changed without complicating the structure of the coupling portion.

In a mobile type wireless communication terminal according to a still further aspect of the invention, two case members are coupled so that the relative position between the two case members can be changed. The terminal includes an internal wireless communication portion that transmits/receives data between the two case members, and an external wireless communication portion that wirelessly communicates with an external device in at least one of the two case members. The transmission power of the internal wireless communication carried out at the transmitting time by the external wireless communication is larger than the transmission power of the internal wireless communication carried out at the receiving time by the external wireless communication.

In this way, the adverse effect of interference between the internal and external wireless communication can be reduced. Consequently, the deterioration in the quality of the internal wireless communication between the case members can be reduced while allowing the communication environment to be changed according to the external wireless communication, and the increase in the quantity of data transmission between the case members can be realized while the flexibility in the positional relation between the case members is secured.

BRIEF DESCRIPTION OF THE DRAWINGS

The invention will be described with reference to the accompanying drawings, wherein like numbers reference like elements, and wherein:

FIGS. 6A through 6C are timing charts for use in illustration of a method of controlling the internal communication in the wireless communication terminal in FIG. 4;

DESCRIPTION OF EMBODIMENTS

Now, a wireless communication terminal and a method of controlling wireless communication according to embodiments of the invention will be described with reference to the drawings.

Figure 1:
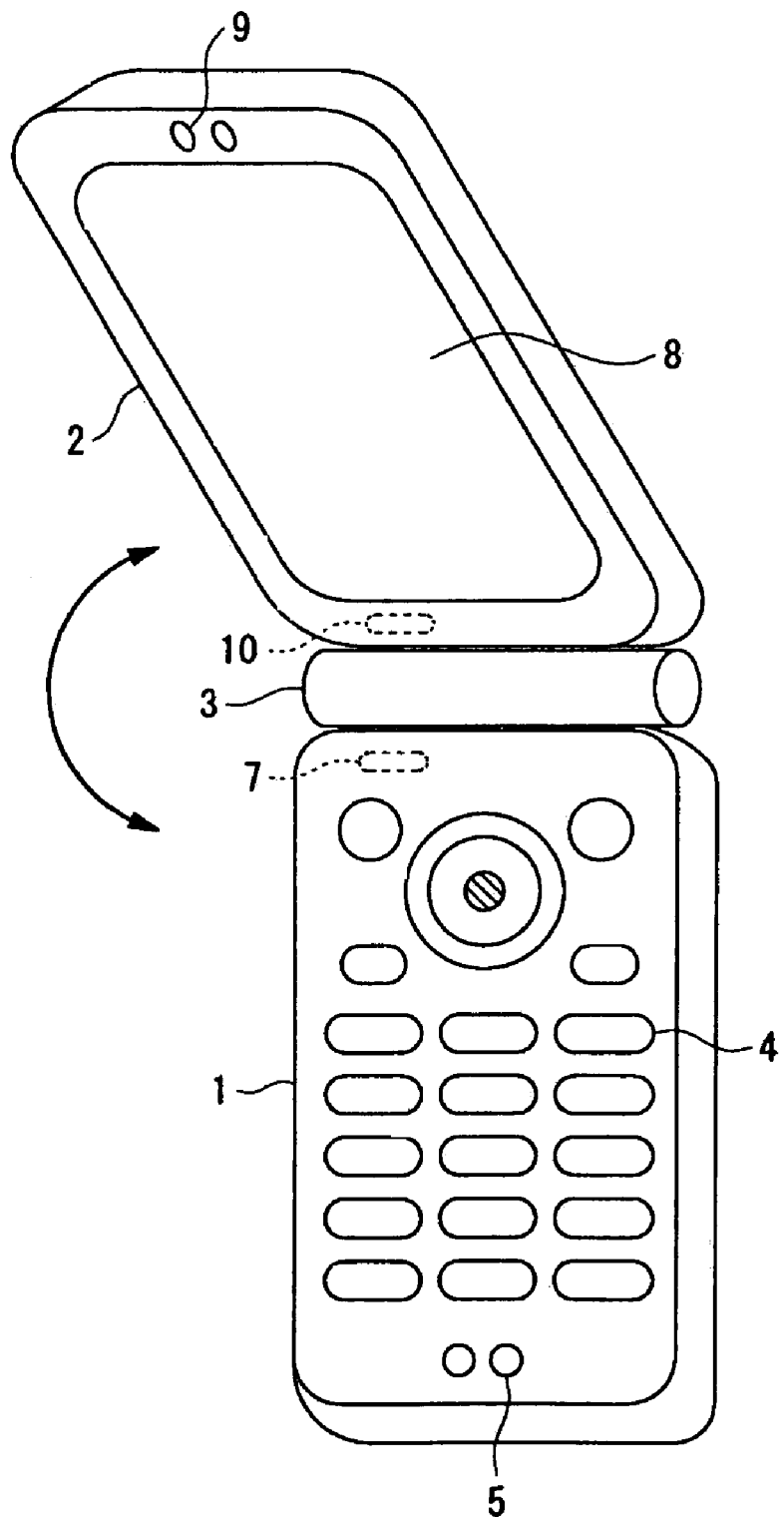
FIG. 1 is a perspective view showing the state of a clamshell type mobile telephone handset to which a method of controlling wireless communication according to the invention is applied as the handset is open.
Figure 2:
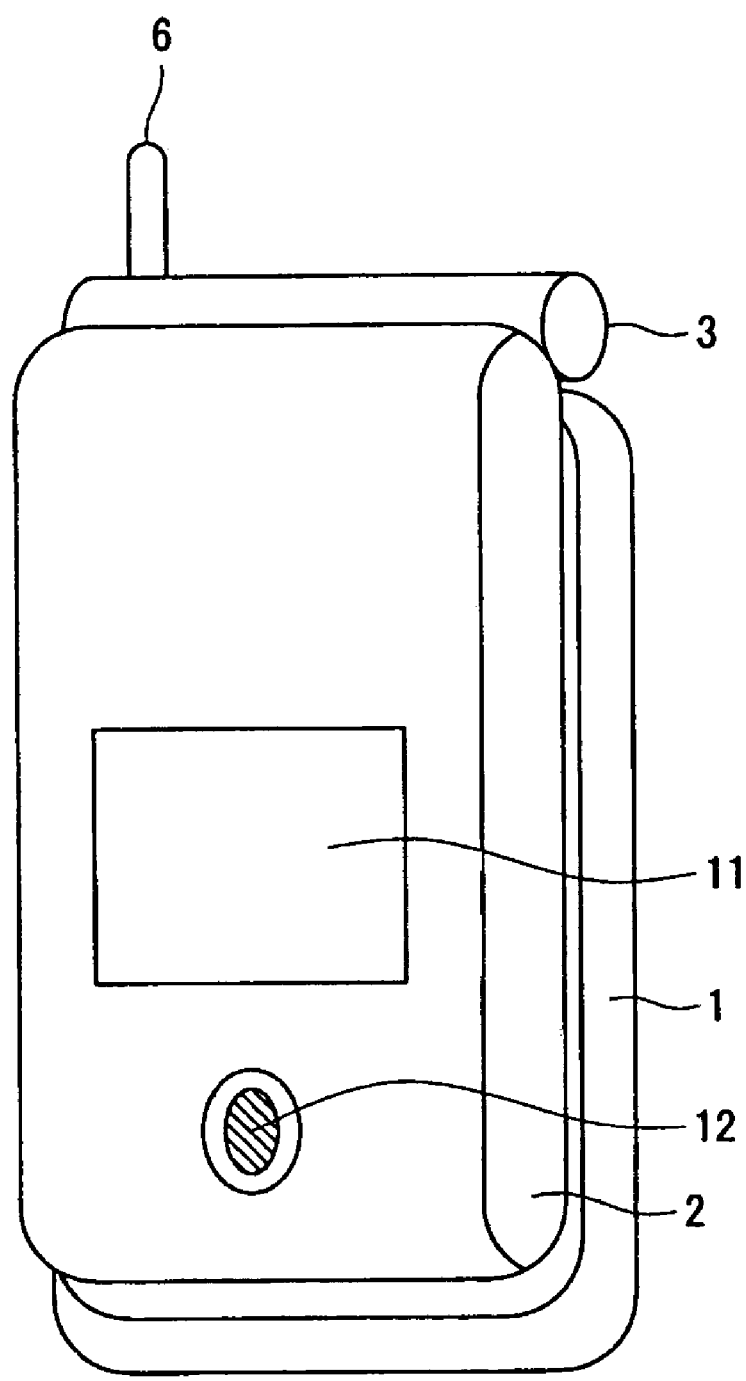
FIG. 2 is a perspective view showing the state of the clamshell type mobile telephone handset to which the method of controlling wireless communication according to the invention is applied as the handset is closed.

FIG. 1 is a perspective view showing the state of a clamshell type mobile telephone to which a method of controlling wireless communication according to the invention is applied as the handset is opened. FIG. 2 is a perspective view showing the state of the clamshell type mobile telephone as the handset is closed.

In FIGS. 1 and 2, operation buttons 4 are provided at the surface of a first case member 1, a microphone 5 is provided at the lower end of the first case member 1, and an external wireless communication antenna 6 is provided on the upper end of the first case member 1. A display part 8 is provided at the surface of a second case member 2 and a speaker 9 is provided at the upper end of the second case member 2. There are a display part 11 and an image-sensing device 12 at the back surface of the second case member 2. Note that as the display parts 8 and 11, for example a liquid crystal panel, an organic EL panel, a plasma display panel or the like may be employed. As the image sensing device 12, a CCD or a CMOS sensor may be used. The first and second case members 1 and 2 are provided with internal wireless communication antennas 7 and 10, respectively for internal wireless communication between these members.

The first and second case members 1 and 2 are coupled through a hinge 3, and the second case member 2 can be folded onto the first case member 1 as the former is pivoted around the hinge 3. When the second case member 2 is closed onto the first case member 1, the operation buttons 4 can be protected by the second case member 2, and the buttons 4 can be prevented from being accidentally operated as the user carries the mobile telephone around. As the second case member 2 is unfolded from the first case member 1, the user can operate the operation buttons 4 while looking at the display part 8 or speaking on the other end using the speaker 9 and the microphone 5, or carry out image-sensing while operating the operation buttons 4.

In this way, the use of the clamshell design allows the display part 8 to be provided almost entirely over one surface of the second case member 2, and therefore the size and the visibility of the display part 8 can be increased without impairing the portability of the mobile telephone.

With the internal wireless communication antennas 7 and 10 provided in the first and second case members 1 and 2, respectively, data transmission between the first and second case members 1 and 2 can be carried out by internal wireless communication. For example, image data or audio data obtained into the first case member 1 through the external wireless communication antenna 6 may be transmitted to the second case member 2 by internal wireless communication using the internal wireless communication antennas 7 and 10, so that images may be displayed at the display part 8, or audio sounds can be output from the speaker 9. Photographic data taken by the image-sensing device 12 may be transmitted from the second case member 2 to the first case member 1 by internal wireless communication using the internal wireless communication antennas 7 and 10 and externally output through the external wireless communication antenna 6.

In this way, the use of wired data transmission between the first and second case members 1 and 2 is no longer necessary, and a flexible wiring board with a large number of pins does not have to be passed through hinge 3. Therefore, the structure of the hinge 3 and the packaging process can be prevented from being complicated. This allows the size of the mobile telephone to be reduced and the reliability to be improved while the cost increase is kept low. In addition, the mobile telephone may have a larger screen and an increased number of functions without impairing its portability.

Figure 3:
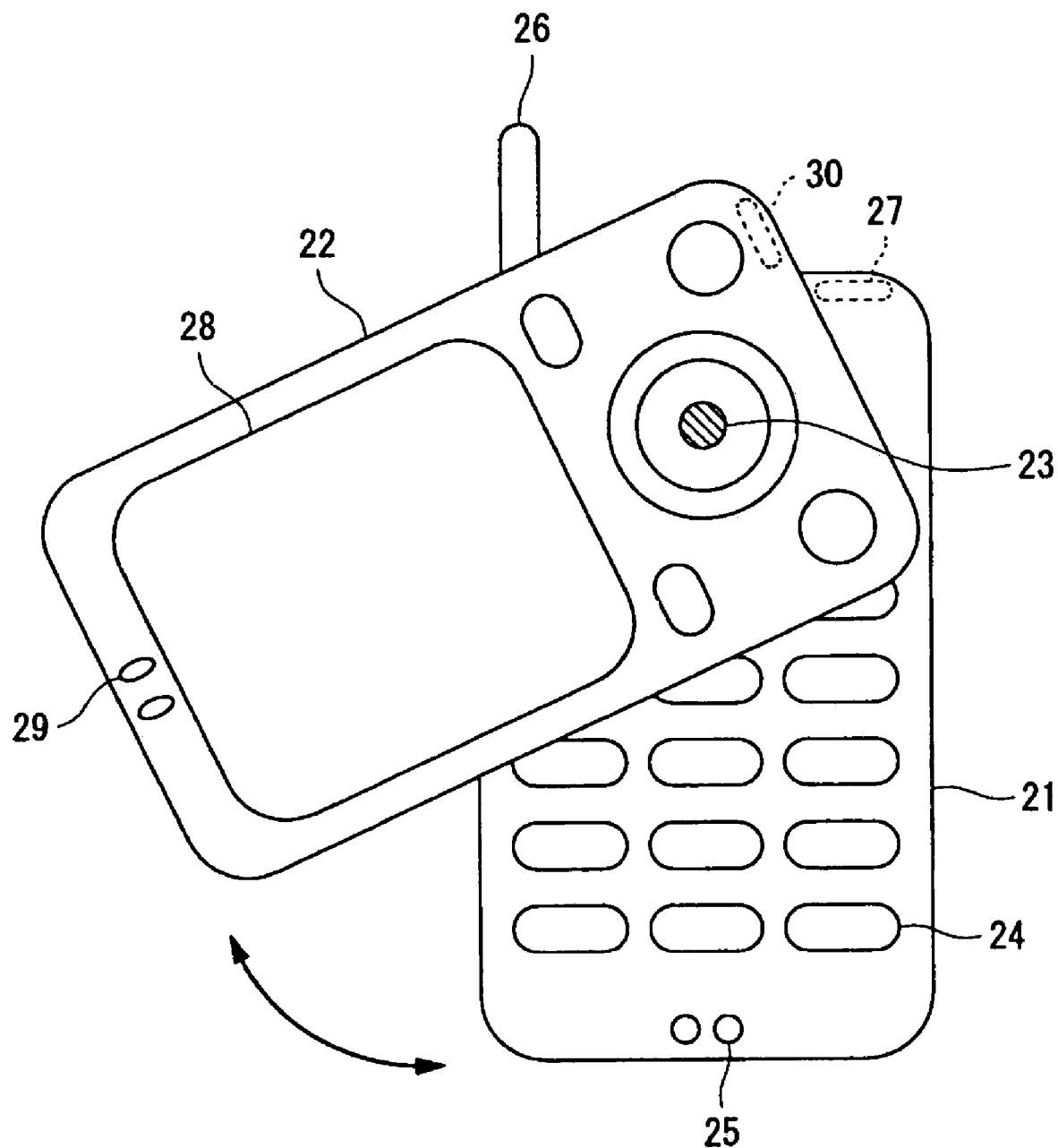
FIG. 3 is a perspective overview of a rotating type mobile telephone handset to which the method of controlling wireless communication according to the invention is applied.

FIG. 3 is a perspective overview of a rotating type mobile telephone to which the method of controlling wireless communication according to the invention is applied.

In FIG. 3, operation buttons 24 are provided at a surface of a first case member 21, a microphone 25 is provided at the lower end of the first case member 21, and an external wireless communication antenna 26 is attached at the upper end of the first case member 21. A display part 28 is provided at the surface of the second case member 22, and a speaker 29 is provided at the upper end of the second case member 22. The first and second case members 21 and 22 are provided with internal wireless communication antennas 27 and 30 between them.

The first and second case members 21 and 22 are coupled through a hinge 23. When the second case member 22 is turned horizontally around the hinge 23, the second case member 22 may be placed on the first case member 21 or may be shifted from the first case member 21. When the second case member 22 is placed on the first case member 21, the operation buttons 24 can be protected by the second case member 22, so that the operation buttons 24 can be prevented from being accidentally operated while the user carries the mobile telephone around. As the second case member 22 is turned horizontally to shift from the first case member 21, the user can operate the operation buttons 24 while looking at the display part 28 or speaking on the other end using the speaker 29 and the microphone 25.

In this way, with the internal wireless communication antennas 27 and 30 provided in the first and second case members 21 and 22, respectively data transmission between the first and second case members 21 and 22 can be carried out by internal wireless communication. For example, image data or audio data obtained into the first case member 21 through the external wireless communication antenna 26 may be transmitted to the second case member 22 by internal wireless communication by the internal wireless communication antennas 27 and 30, and images can be displayed at the display part 28 or audio sounds may be output from the speaker 29.

In this way, a flexible wiring board with a large number of pins does not have to be passed through hinge 23. Therefore, the structure of the hinge 23 can be prevented from being complicated, and the packaging process can be prevented from being complicated. This allows the size of the mobile telephone to be reduced and the reliability to be improved while keeping the cost low. In addition, the mobile telephone may have a larger screen and an increased number of functions without impairing its portability.

Note that according to the above described embodiment, the mobile telephone has been described by way of illustration, but the invention may be applied to a PDA (Personal Digital Assistant), a notebook type personal computer, and the like.

Figure 4:
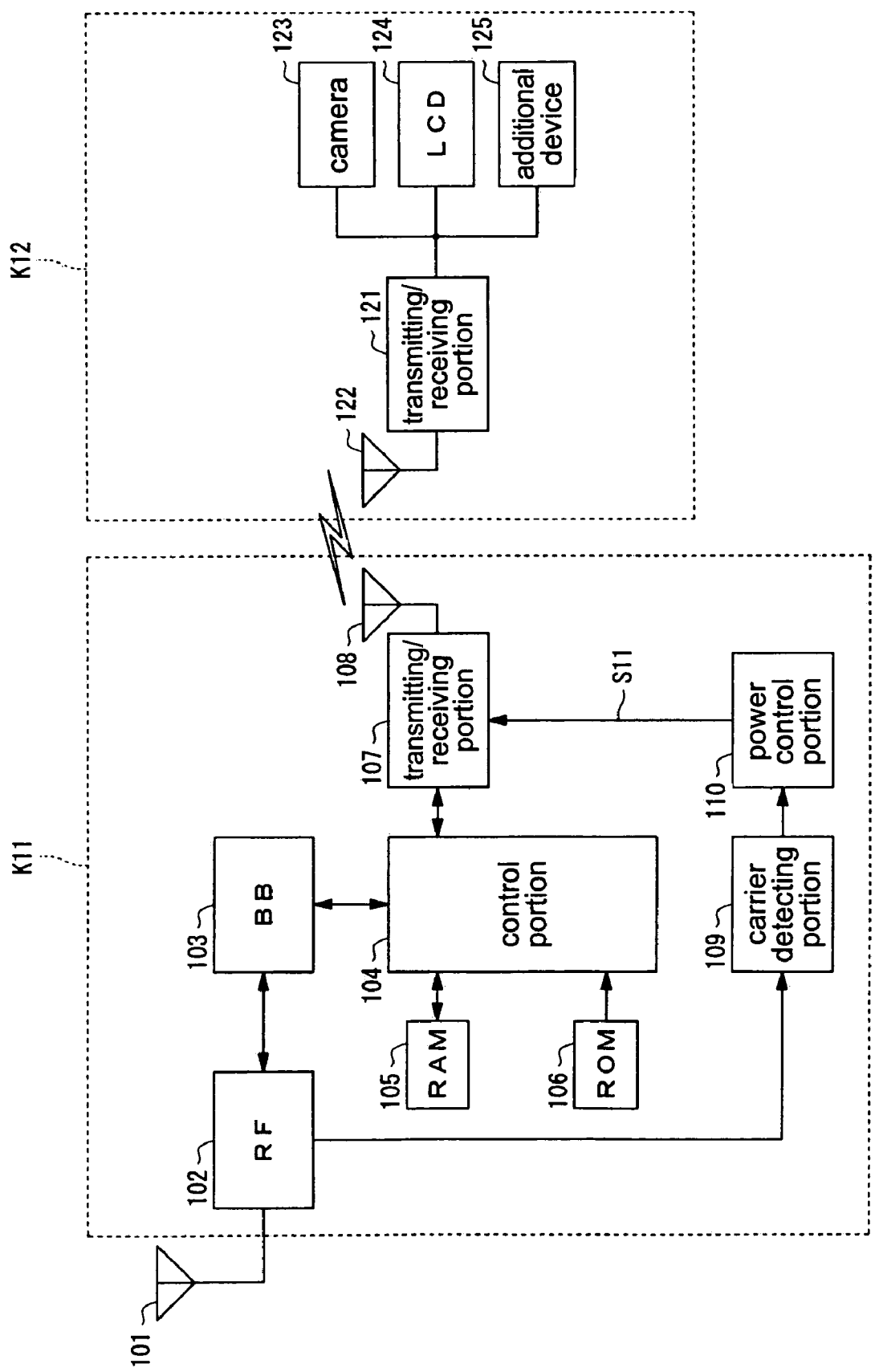
FIG. 4 is a schematic block diagram of the configuration of a wireless communication terminal according to a first embodiment of the invention.

FIG. 4 is a schematic block diagram of a wireless communication terminal according to a first embodiment of the invention.

In FIG. 4, a first case member K11 includes an external wireless communication antenna 101 that transmits/receives waves for external wireless communication, a radio frequency processing portion 102 that modulates/demodulates a signal transmitted/received through the external wireless communication antenna 101, a base band signal processing portion 103 that carries out base band signal processing, a control portion 104 that controls the wireless communication terminal as a whole, a RAM 105 that provides the control portion 104 with a work area for carrying out processing and storing the result of processing, a ROM 106 that stores various control programs used to operate the wireless communication terminal, a transmitting/receiving portion 107 that controls the internal wireless communication carried out through the internal wireless communication antenna 108, an internal wireless communication antenna 108 that transmits/receives waves for internal wireless communication on the side of the first case member K11, a carrier detecting portion 109 that detects the output level of a radio frequency processing portion 102, and an electric power control portion 110 that instructs the transmitting/receiving portion 107 to control the output power of the waves transmitted through the internal wireless communication antenna 108.

Note that when the output power of the waves transmitted through the internal wireless communication antenna 108 is controlled, the transmission power of the internal wireless communication carried out at the time of transmission by external wireless communication can be set larger than the transmission power of internal wireless communication carried out at the receiving time by external wireless communication.

The second case member K12 includes a transmitting/receiving portion 121 that controls internal wireless communication carried out through an internal wireless communication antenna 122, the internal wireless communication antenna 122 that transmits/receives waves for internal wireless communication on the side of the second case member K12, a camera 123 that carries out image-sensing, a liquid crystal display 124 that indicates display data, and an additional device 125. Note that the data transmitted/received by external wireless communication is for example audio data during telephone communication, character data and image data during e-mailing, and the like. The data transmitted/received by internal wireless communication is photographic data taken by the camera 123, display data to be displayed on the liquid crystal display 124 or a control signal used to control the second case member K12. The control portion 104 may be a CPU. The additional device 125 for example may be an LED, a microphone, or a speaker.

The first and second case members K11 and K12 are coupled so that their positional relation can be changed. Note that the positional relation between the first and second case members K11 and K12 may be changed by folding the second case member K12 onto the first case member K11, by horizontally turning the second case member K12 on the first case member K11, or by sliding the second case member K12 on the first case member K11 from side to side or backward/forward.

When data is transmitted through the external wireless communication antenna 101, the transmission data transmitted to the base band signal processing portion 103 is subjected to base-band signal processing. The transmission data output from the base band signal processing portion 103 is modulated by the radio frequency processing portion 102, and the resulting data is externally transmitted through the external wireless communication antenna 101. Meanwhile, when data is received through the external wireless communication antenna 101, the data received through the external wireless communication antenna 101 is sent to the radio frequency processing portion 102, where the data is demodulated. The reception data output from the radio frequency processing portion 102 is sent to the base band signal processing portion 103 and subjected to base band signal processing, and the resulting data is then output to the control portion 104.

In this case, a signal transmitted/received from/at the radio frequency processing portion 102 is sent to the carrier detecting portion 109, where the input/output level of the radio frequency processing portion 102 is detected. The power control portion 110 then determines whether the transmission or the reception is carried out by the external wireless communication based on the input/output level of the radio frequency processing portion 102.

Figure 5:
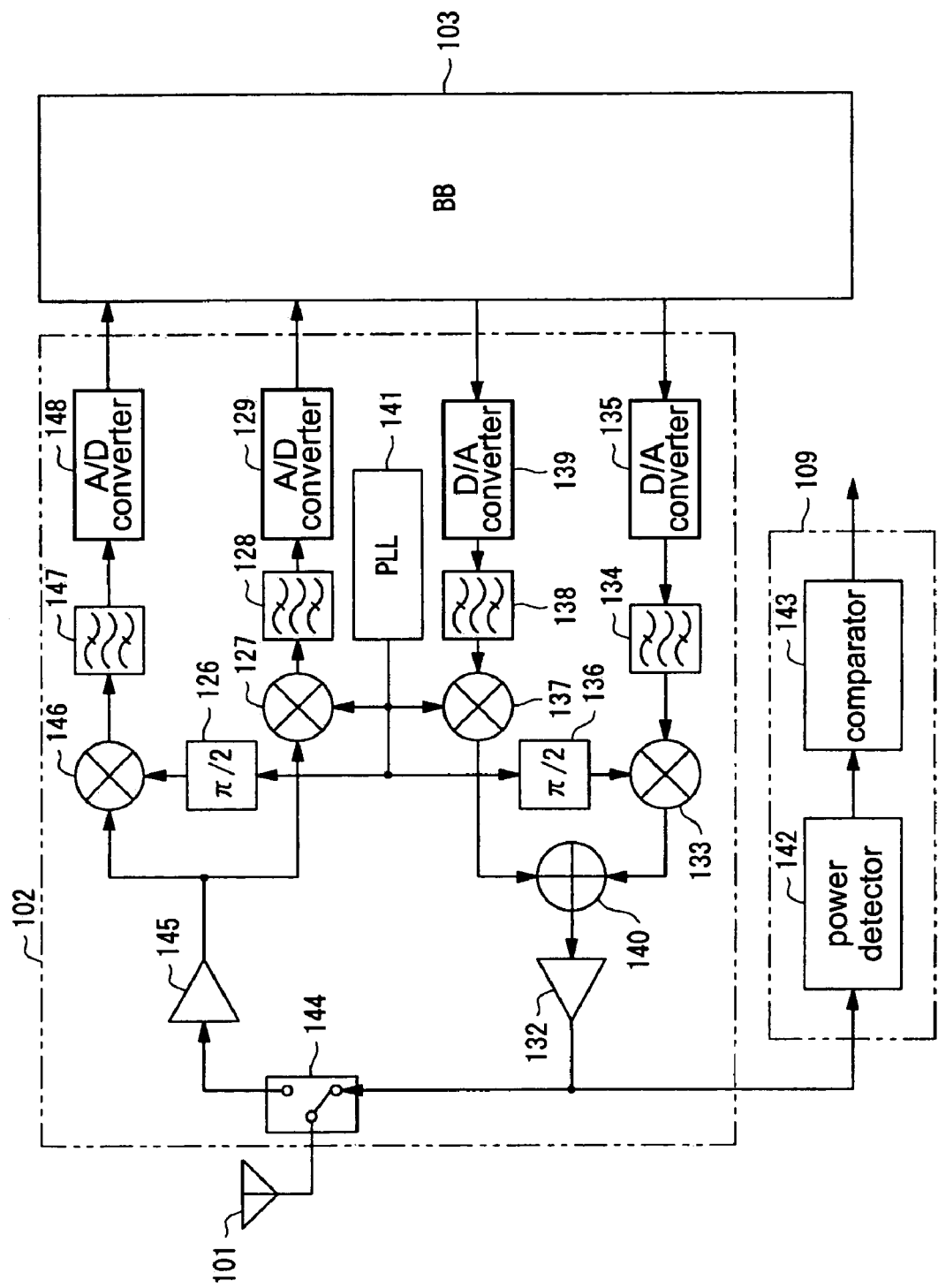
FIG. 5 is a schematic block diagram of the configuration of a radio frequency processing portion and a carrier detecting portion in FIG. 4.

FIG. 5 is a schematic block diagram of the radio frequency processing portion 102 and the carrier detecting portion 109 in FIG. 4.

In FIG. 5, the radio frequency processing portion 102 includes a switch 144, a low-noise amplifier 145, a power amplifier 132, mixers 146, 127, 133, and 137, filters 147, 128, 134, and 138, A/D converters 148, 129, D/A converters 135, 139, phase shifters 126 and 136, an adder 140, and a PLL circuit 141. The carrier detecting portion 109 is provided to detect the output level at the time of transmission. The carrier detecting portion 109 includes a power detector 142 and a comparator 143.

At the receiving time, the switch 144 is switched to the side of the low-noise amplifier 145. A signal received through the external wireless communication antenna 101 is sent to the mixers 146 and 127 through the low-noise amplifier 145. A local oscillation signal produced by the PLL circuit 141 is input to the mixer 146 through the phase shifter 126 and a local oscillation signal generated by the PLL circuit 141 is directly input to the mixer 127.

The signal output from the low-noise amplifier 145 is mixed with the phase-shifted local oscillation signal at the mixer 146, and then has a desired frequency component extracted by the filter 147. The signal then output from the filter 147 is digitized by an A/D converter 148, and then sent to the base band signal processing portion 103. The signal output from the low-noise amplifier 145 is mixed with the local oscillation signal at the mixer 127, and then has a desired frequency component extracted by the filter 128. The signal output from the filter 128 is digitized by the A/D converter 129, and then sent to the base band signal processing portion 103.

Meanwhile, at the time of transmission, the switch 144 is switched to the side of power amplifier 132. Signals output from the base band signal processing portion 103 are converted into analog signals by D/A converters 135 and 139 and then have desired frequency components extracted by filters 134 and 138. The signals output from the filters 134 and 138 are transmitted to the mixers 133 and 137, respectively. A local oscillation signal generated by the PLL circuit 141 is input to the mixer 133 through the phase shifter 136, and a local oscillation signal generated by the PLL circuit 141 is directly input to the mixer 137. The signal output from the filter 134 is mixed with the phase-shifted local oscillation signal at the mixer 133 and then transferred to the adder 140. The signal output from the filter 138 is mixed with the local oscillation signal at the mixer 137 and then transmitted to the adder 140. After the signals output from the mixers 133 and 137 are added at the adder 140 and then transmitted to the external wireless communication antenna 101 through the power amplifier 122 and externally output through the external wireless communication antenna 101.

The signal output from the power amplifier 132 is transmitted to the power director 142, where the transmission output level is detected. The output level detected by the power detector 142 is compared to a reference value at the comparator 143, and the result of the comparison is sent to the power control portion 110 in FIG. 4.

The power control portion 110 determines whether the transmission or the reception is carried out by the external wireless communication based on the output level detected by the carrier detecting portion 109 once the output level at the time of external wireless communication is detected by the carrier detecting portion 109. If the transmission is carried out by the external wireless communication, the power control portion 110 can instruct the transmitting/receiving portion 107 to raise the transmission power of the internal wireless communication, and if the reception is carried out by the external wireless communication, the control portion can instruct the transmitting/receiving portion 107 to lower the transmission power of the internal wireless communication. Note that when neither transmission nor reception is carried out by the external wireless communication, the power control portion 110 can issue an instruction so that the transmission power of the internal wireless communication is equal to or lower than the transmission power of the internal wireless communication when the reception is carried out by the external wireless communication.

In this case, as the communication method in the external wireless communication at the wireless communication terminal, TDMA (Time Division Multiple Access), a multiple access method may be employed. By TDMA, one frequency band is segmented by prescribed time intervals, and a plurality of users can share one frequency band each for a prescribed period. More specifically, the frequency band is divided by time intervals, and allocated to the wireless communication terminal, and for the allocated time period, the entire band width can be used. The wireless communication terminals can continuously and periodically transmit signals.

FIGS. 6A through 6C are timing charts for use in illustration of a method of controlling internal communication at the wireless communication terminal in FIG. 4.

In FIG. 6A, if for example slot 1 among slots 1 through 4 represents the transmission timing allocated to the user wireless communication terminal, in the other slots 2 through 4, data is not transmitted from the user wireless communication terminal to the base station. Therefore, the carrier detecting portion 109 in FIG. 4 can monitor the input/output level of the radio frequency processing portion 102 and detect the transmission timing allocated to the user wireless communication terminal. As shown in FIG. 6B, the power control portion 110 can generate a transmission timing signal S11 based on the output level detected by the carrier detecting portion 106 and output the transmission timing signal S11 to the transmitting/receiving portion 107. Upon receiving the transmission timing signal S11 from the power control portion 110, the transmitting/receiving portion 107 can transmit image data or audio data transmitted from the control portion 104 while the output power of the waves output from the internal wireless communication antenna 108 is raised as shown in FIG. 6C. The image data or audio data transmitted through the internal wireless communication antenna 108 is received through the internal wireless communication antenna 122. The transmitting/receiving portion 121 can make the liquid crystal display part 124 display the image data received through the internal wireless communication antenna 122 or the speaker output the audio data received through the internal wireless communication antenna 122.

Figure 7:
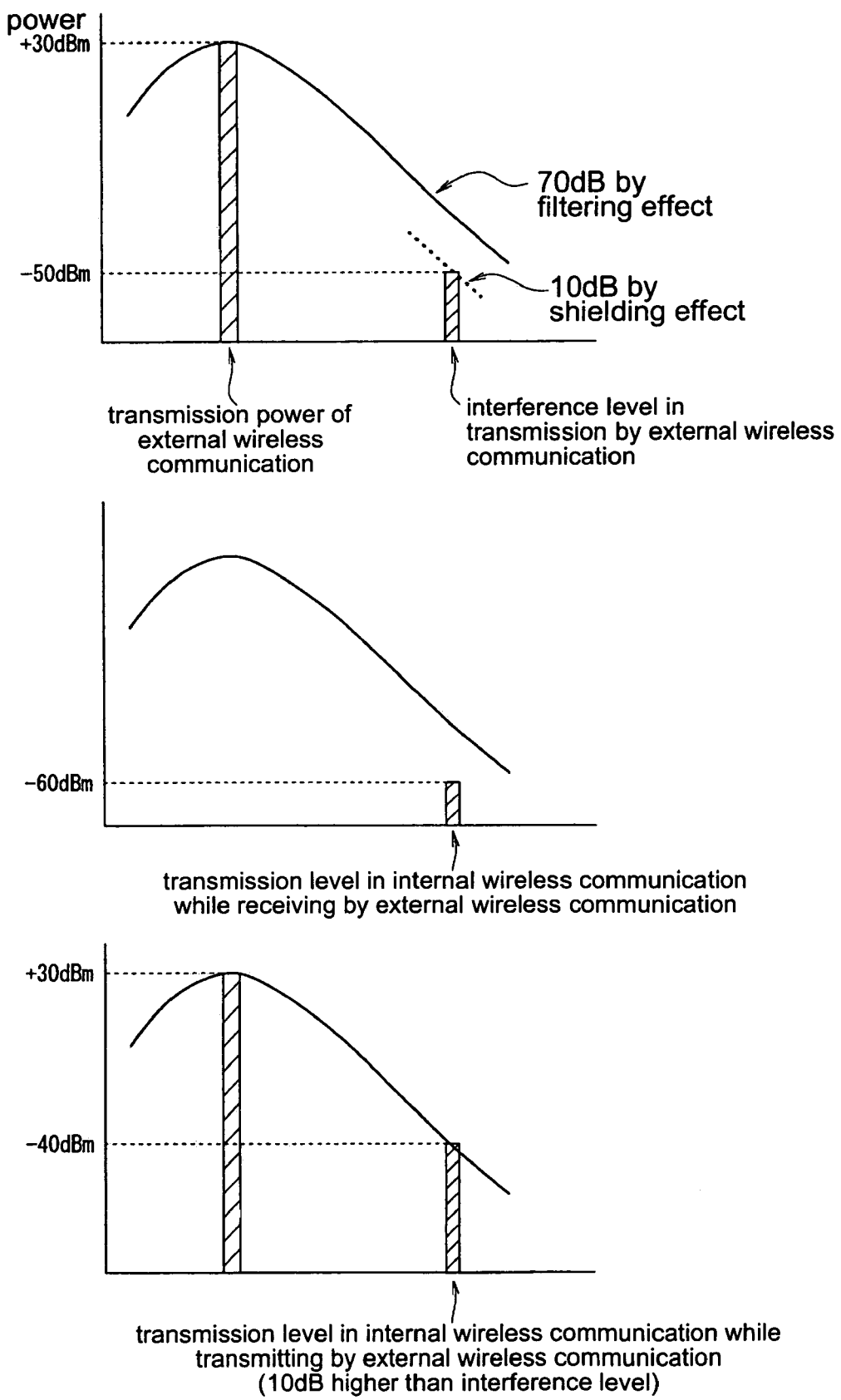
FIG. 7 includes graphs for use in illustrating how to set transmission power according to an embodiment of the invention.

FIG. 7 includes graphs for use in illustrating how to set the transmission power of the internal wireless communication according to an embodiment of the invention.

In FIG. 7, the power transmitted through the internal wireless communication antenna 108 at the receiving time by the external wireless communication is set to −60 dBm so that the power does not interfere with the reception by the external wireless communication. Meanwhile, the power transmitted through the external wireless communication antenna 101 is +30 dBm. If the interference by the external wireless communication can be attenuated by 70 dB by the filtering characteristic F and the interference by the external wireless communication can be attenuated by 10 dB by shielding, the power transmitted through the internal wireless communication antenna 108 at the time of transmission by the external wireless communication is increased by 20 dB, so that the interference by the external wireless communication can be reduced while the internal wireless communication can be carried out stably with the margin of 10 dB.

At the receiving time by the external wireless communication, the power transmitted through the internal wireless communication antenna 108 is returned to the original −60 dBm, so that the effect of the internal wireless communication upon the receiving operation by the external wireless communication can be reduced. In this case, at the receiving time by the external wireless communication, the effect of the waves by the external wireless communication is smaller than at the time of transmission by the external wireless communication, and therefore the communication quality by the internal wireless communication can be secured even if the output power by the internal wireless communication is small.

Note that a mobile telephone is a specific example of a wireless communication terminal. Therefore, when the clamshell design is employed for a mobile telephone, data transmission between the first and second case members K11 and K12 can be stably wirelessly carried out. As a result, if the quantity of data exchanged between the first and second case members K11 and K12 increases as the resolution of the liquid crystal display part 124 and the screen size increase in the mobile telephone, the increase in the number of interconnections between the first and second case members K11 and K12 can be reduced. This prevents the hinge structure and the packaging process from being complicated.

As the internal wireless communication using the internal wireless communication antennas 7 and 10, very weak radio or close range radio by UWB radio may be employed. In this way, the internal wireless communication can be carried out stably while the output level of the internal wireless communication can be reduced. Therefore, if the data transmission quantity between the first and second case members K11 and K12 increases, the data transmission between them can be carried out wirelessly within the legal restrictions, and therefore the increase in the number of interconnections between the first and second case members K11 and K12 can be reduced.

The embodiment shown in FIG. 4 is related to how the power control portion 110 outputs the transmission timing signal S11 to the transmitting/receiving portion 107, while the transmission timing signal may be output to both the transmitting/receiving portions 107 and 121. The transmitting/receiving portion 121 may raise the transmission power by the internal wireless communication carried out through the internal wireless communication antenna 122 at the time of transmission by the external wireless communication.

According to the above-described embodiment, TDMA has been described as the method for external wireless communication by way of illustration, but a multiple access method such as FDMA (Frequency Division Multiple Access) and CDMA (Code Division Multiple Access) may be applied other than TDMA.

Figure 8:
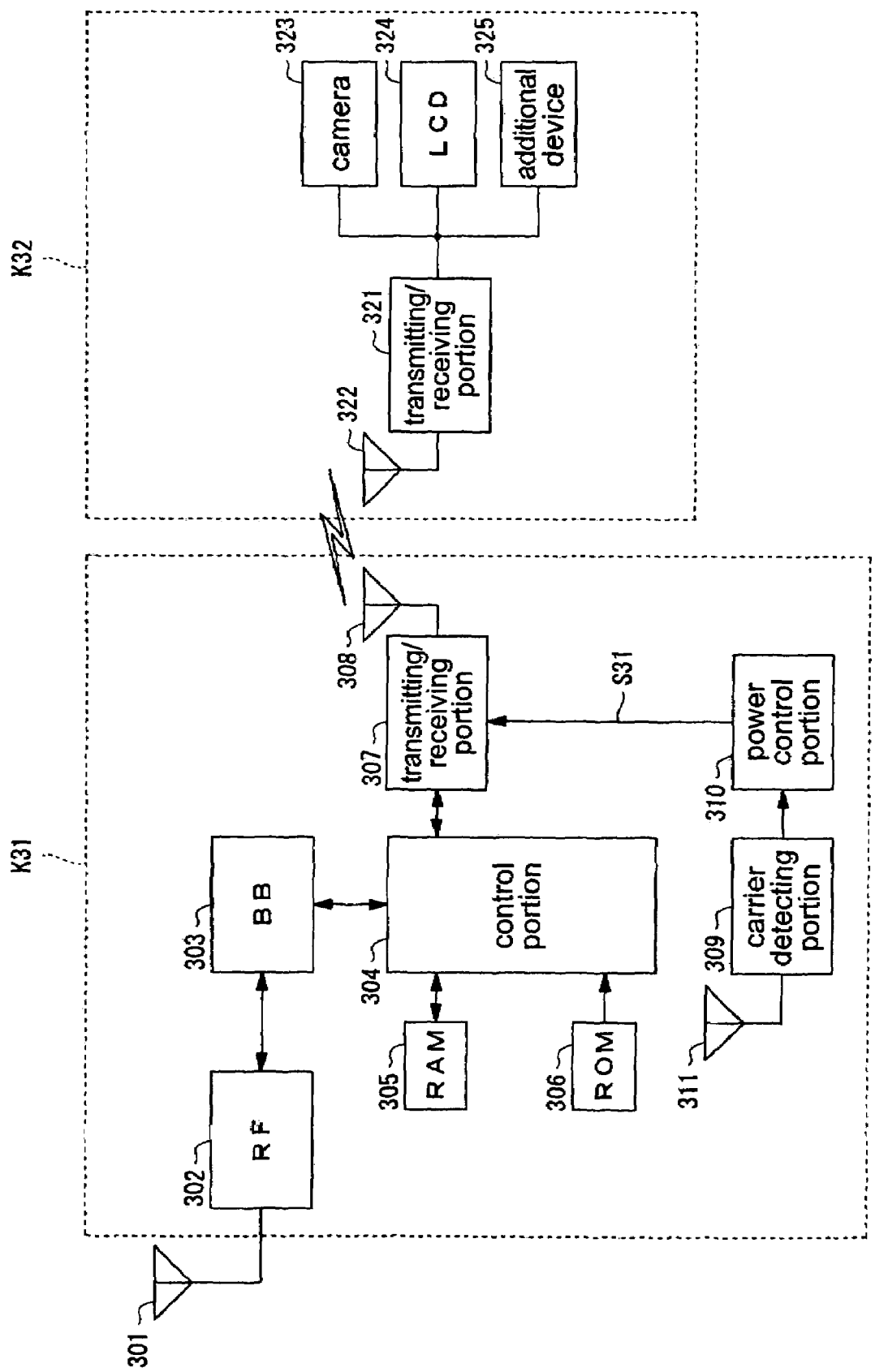
FIG. 8 is a schematic block diagram of the configuration of a wireless communication terminal according to a second embodiment of the invention.

FIG. 8 is a schematic block diagram of the configuration of a wireless communication terminal according to a second embodiment of the invention.

In FIG. 8, a first case member K31 includes an external wireless communication antenna 301, a radio frequency processing portion 302, a base band signal processing portion 303, a control portion 304, a RAM 305, a ROM 306, a transmitting/receiving portion 307, an internal wireless communication antenna 308, a carrier detecting portion 309, an power control portion 310, and a carrier detecting antenna 311. A second case member K32 includes a transmitting/receiving portion 321, an internal wireless communication antenna 322, a camera 323, a liquid crystal display part 324, and an additional device 325. The first and second case members K31 and 32 are hinged together so that their positional relation can be changed.

Waves transmitted through the external wireless communication antenna 301 are received by the carrier detecting antenna 311, and the carrier detection signal is transmitted to the carrier detecting portion 309. Upon receiving the carrier detection signal received by the carrier detecting antenna 311, the carrier detecting portion 309 detects the output level of the carrier detection signal and outputs the determination result to the power control portion 310.

The power control portion 310 generates a transmission timing signal S31 based on the output level detected by the carrier detecting portion 309 and outputs the transmission timing signal S31 to the transmitting/receiving portion 307. Upon receiving the transmission timing signal S31 from the power control portion 310, the transmitting/receiving portion 307 can carry out internal wireless communication between the first and second case members K31 and K32 while the output power of the waves output from the internal wireless communication antenna 308 is raised.

In this way, the output level of the waves transmitted through the external wireless communication antenna 301 can be directly monitored and it can be determined whether or not the waves are transmitted through the external wireless communication antenna 301. Therefore, according to the transmission timing for external wireless communication, the transmission power of the internal wireless communication can be controlled, and therefore the cost can be prevented from increasing, the size of the wireless communication terminal can be reduced, and the reliability of the terminal can be improved. Meanwhile, the size of the screen at the wireless communication terminal can be increased and the number of functions carried out by the terminal can be increased while the portability of the terminal is not impaired.

Figure 9:
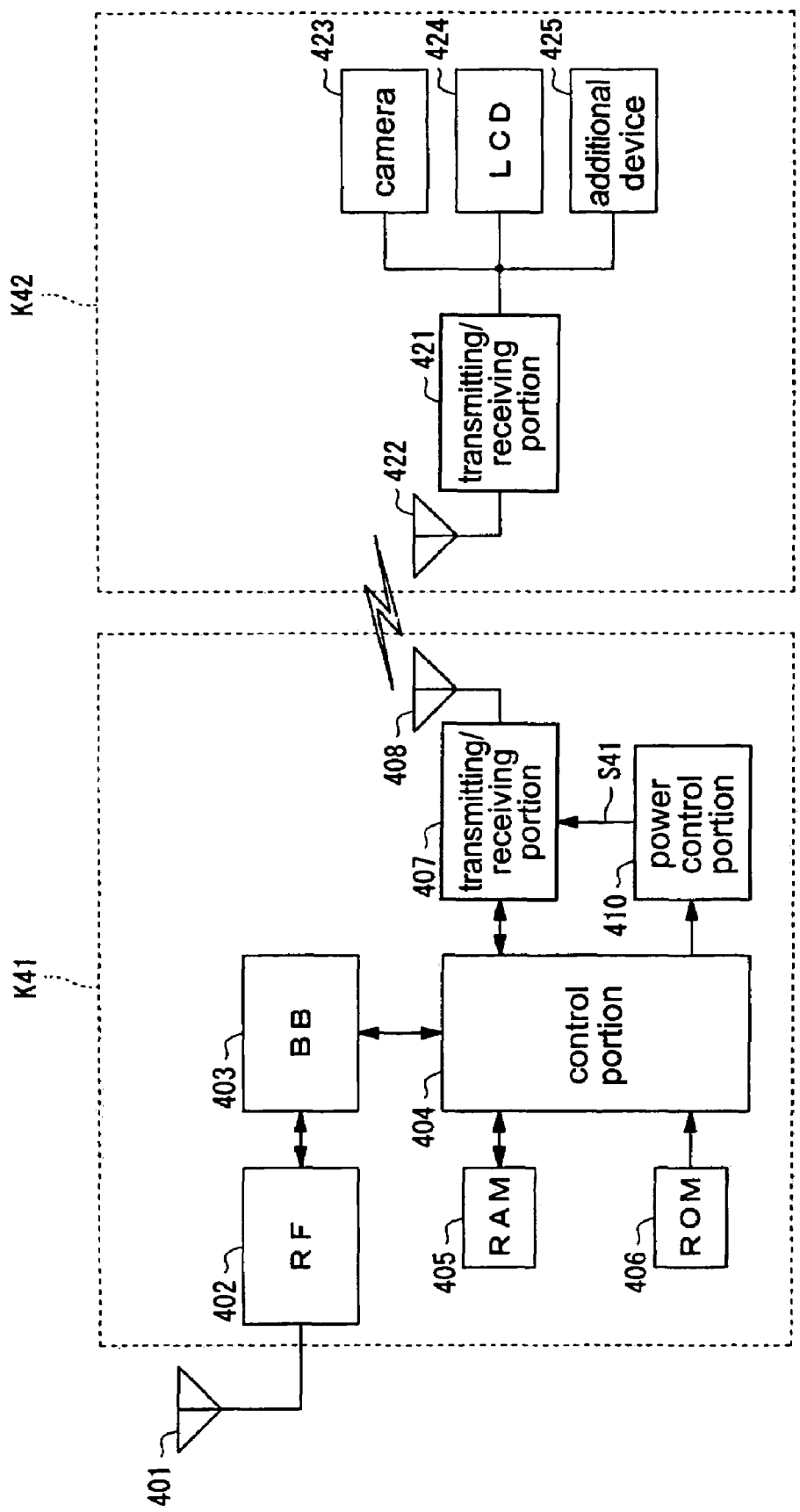
FIG. 9 is a schematic block diagram of the configuration of a wireless communication terminal according to a third embodiment of the invention.

FIG. 9 is a schematic block diagram of the configuration of a wireless communication terminal according to a third embodiment of the invention.

In FIG. 9, A first case member K41 includes an external wireless communication antenna 401, a radio frequency processing portion 402, a base band signal processing portion 403, a control portion 404, a RAM 405, a ROM 406, a transmitting/receiving portion 407, an internal wireless communication antenna 408, and a power control portion 410. A second case member K42 includes a transmitting/receiving portion 421, an internal wireless communication antenna 422, a camera 423, a liquid crystal display part 424, and an additional device 425. The first and second case members K41 and K42 are coupled so that their positional relation can be changed.

When data is transmitted through the external wireless communication antenna 401, the control portion 404 transmits transmission data to the base band signal processing portion 403 and notifies the power control portion 410 of the transmission timing at the time of transmitting the data. The base band signal processing portion 403 carries out base band signal processing to the transmission data from the control portion 404 and outputs the resulting data to the radio frequency processing portion 402. Upon receiving the transmission data after the base band signal processing, the radio frequency processing portion 402 modulates the received data and externally output the resulting signal through the external wireless communication antenna 401.

When the power control portion 410 is notified of the transmitting timing for the transmission data from the control portion 404, the power control portion 410 generates a transmission timing signal S41 and outputs the generated signal S41 to the transmitting/receiving portion 407. Upon receiving the transmission timing signal S41 from the power control portion 410, the transmitting/receiving portion 407 can carry out internal wireless communication between the first and second case members K41 and K42 while the output power of the waves output from the internal wireless communication antenna 408 is raised.

In this way, it can be determined whether or not waves are transmitted through the external wireless communication antenna 401 in response to the transmission timing information received from the control portion 404. Therefore, the transmission power of the internal wireless communication can be controlled in response to the transmission timing for external wireless communication. In this way, the size of the wireless communication terminal can be reduced and the reliability can be improved while an increase in cost is kept low. In addition, the screen size of the wireless communication terminal and the number of functions can be increased without impairing the portability of the wireless communication terminal.

Note that in the wireless communication terminal, the communication protocol with the outside may be determined in advance based on the operation mode such as waiting, speaking, and packet telecommunication. Therefore, the control portion 404 can obtain the transmission/reception timing in advance when for example TDMA or packet communication is carried out. Therefore, the power control portion 410 may control the output power of waves output from the internal wireless communication antenna 408 based on the time schedule determined according to the transmission/reception timings for external wireless communication.

Figure 10:
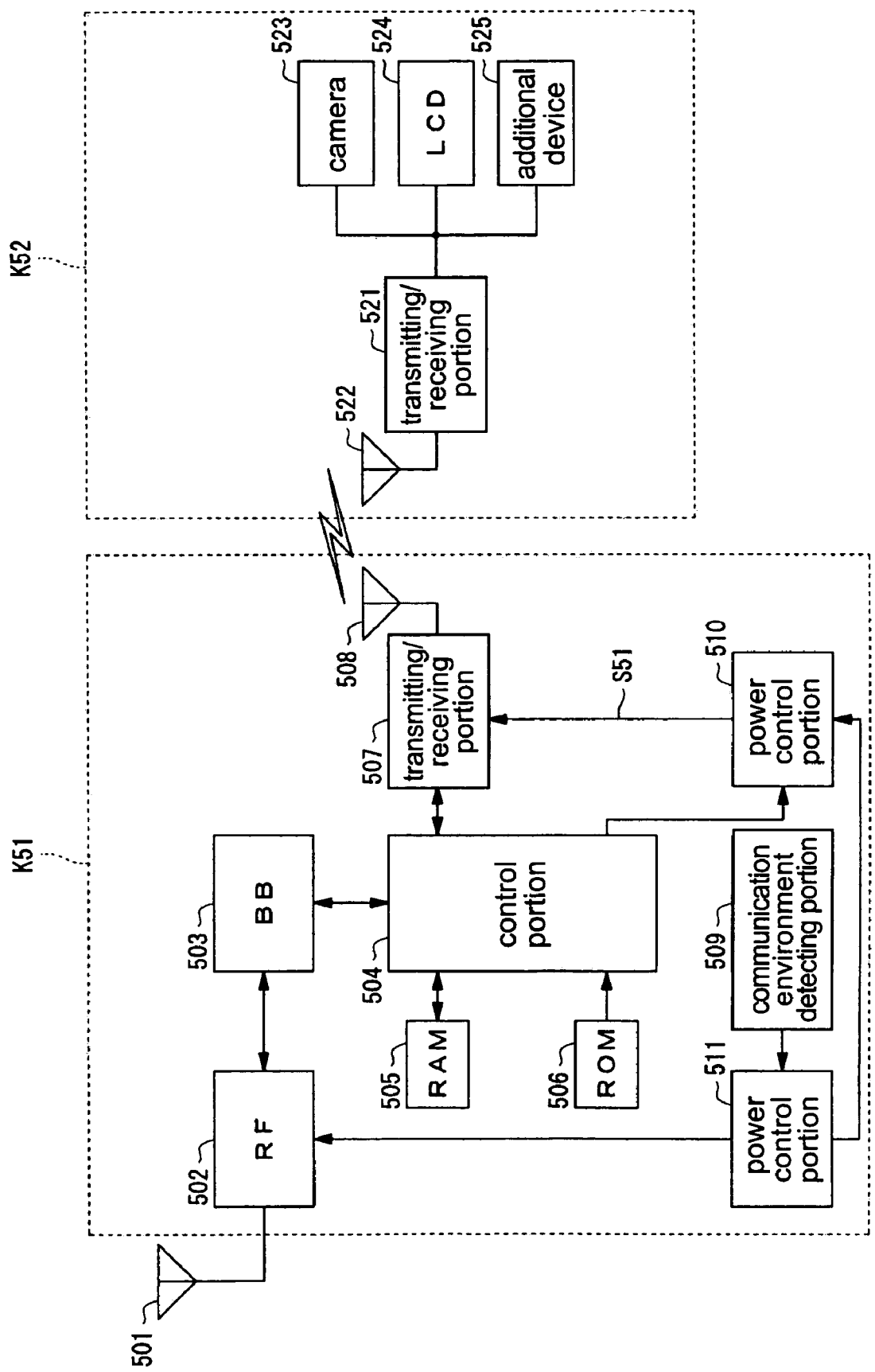
FIG. 10 is a block diagram of the configuration of a wireless communication terminal according to a fourth embodiment of the invention.

FIG. 10 is a block diagram of the configuration of a wireless communication terminal according to a fourth embodiment of the invention.

In FIG. 10, a first case member K51 includes an external wireless communication antenna 501, a radio frequency processing portion 502, a base band signal processing portion 503, a control portion 504, a RAM 505, a ROM 506, a transmitting/receiving portion 507, an internal wireless communication antenna 508, a communication environment detecting portion 509, and power control portions 510 and 511. A second case member K52 includes a transmitting/receiving portion 521, an internal wireless communication antenna 522, a camera 523, a liquid crystal display part 524, and an additional device 525. The first and second case members K51 and K52 are coupled so that their positional relation can be changed.

In this case, the communication environment detecting portion 509 detects a communication environment based on a reception signal received through the external wireless communication antenna 501. Note that the communication environment may be detected based on the bit error rate for digital signals, and based on the signal-to-noise ratio or distortion factor for analog signals. The power control portion 511 controls the output power of waves transmitted from the external wireless communication antenna 501 based on the communication environment detected by the communication environment detecting portion 509. The power control portion 510 controls the output power of waves transmitted from the internal wireless communication antenna 508 based on the control result by the power control portion 511.

When data is transmitted through the external wireless communication antenna 501, the control portion 504 notifies the power control portion 510 of the transmission timing for transmitting the transmission data. When the power control portion 510 is notified of the transmission timing for the transmission data from the control portion 504, the power control portion 510 generates a transmission timing signal S51, and outputs the generated signal S51 to the transmitting/receiving portion 507. Upon receiving the transmission timing signal S51 from the power control portion 510, the transmitting/receiving portion 507 carries out internal wireless communication between the first and second case members K51 and K52 while the output power of the waves output from the internal wireless communication antenna 408 is raised.

Meanwhile, when the communication environment is detected at the communication environment detecting portion 509, the detection result is sent to the power control portion 511. When the communication environment is degraded, the power control portion 511 instructs the radio frequency processing portion 502 to raise the output power of the waves output from the external wireless communication antenna 501. Upon receiving the instruction to raise the output power from the power control portion 511, the radio frequency processing portion 502 raises the output power of waves output from the external wireless communication antenna 501.

When the output power of waves output from the external wireless communication antenna 501 is raised, the power control portion 511 instructs the power control portion 510 to raise the output power of waves output from the internal wireless communication antenna 508. Upon receiving the instruction to raise the output power from the power control portion 511, the power control portion 510 instructs the transmitting/receiving portion 507 to raise the output power of waves output from the external wireless communication antenna 508.

Upon receiving the instruction to raise the output power from the power control portion 510, the transmitting/receiving portion 507 can raise the output power of waves output from the internal wireless communication antenna 508 by an amount corresponding to the increase in the output power of waves output from the external wireless communication antenna 501.

In this way, the transmission power of the external wireless communication can be controlled based on the communication environment, and the transmission power of the internal wireless communication can be increased based on the transmission power of the external wireless communication. Therefore, the quality of the internal wireless communication can be kept less degraded while the quality of the external wireless communication can be improved.

What is claimed is:

1. A wireless communication terminal, comprising:
a first case member;
a second case member coupled with the first case member;
a coupling portion that couples the first and second case members so that a positional relation between the first and second case members can be changed;
an external wireless communication antenna provided at the first case member;
an external wireless communication control portion that controls external wireless communication carried out through the external wireless communication antenna;
a first internal wireless communication antenna;
a first internal wireless communication control portion that controls internal wireless communication carried out through the first internal wireless communication antenna;
a display part provided at the second case member;
a second internal wireless communication antenna;
a second internal wireless communication control portion that controls internal wireless communication carried out through the second internal wireless communication antenna; and
an output power control portion that controls output power of waves transmitted by the internal wireless communication based on a timing of transmitting waves transmitted through the external wireless communication antenna,
wherein the output power control portion sets transmission power of the internal wireless communication carried out at a time of transmission by the external wireless communication to be larger than the transmission power of the internal wireless communication carried out at a receiving time by the external wireless communication.

2. The wireless communication terminal according to claim 1, wherein:
the wireless communication terminal comprises a mobile telephone.

3. The wireless communication terminal according to claim 1, wherein:
the internal wireless communication comprises one of a very weak radio and a close range radio by UWB radio.

4. A wireless communication terminal, comprising:
a first case member;
a second case member;
a coupling portion that couples the first and second case members so that a positional relation between the first and second case members can be changed;
an external wireless communication antenna provided at the first case member;
an external wireless communication control portion that controls external wireless communication carried out through the external wireless communication antenna;
a first internal wireless communication antenna;
a first internal wireless communication control portion that controls internal wireless communication carried out through the first internal wireless communication antenna;
a display part provided at the second case member;
a second internal wireless communication antenna;
a second internal wireless communication control portion that controls internal wireless communication carried out through the second internal wireless communication antenna;
a carrier detecting portion that detects an output level of waves transmitted from the external wireless communication antenna; and
an output control portion that controls output power of waves transmitted from at least one of the first and second internal wireless communication antennas based on the output level detected by the carrier detecting portion,
wherein the output power control portion sets transmission power of the internal wireless communication carried out at a time of transmission by the external wireless communication to be larger than the transmission power of the internal wireless communication carried out at a receiving time by the external wireless communication.

5. The wireless communication terminal according to claim 4, wherein:
the wireless communication terminal comprises a mobile telephone.

6. The wireless communication terminal according to claim 4, wherein:
the internal wireless communication is one of a very weak radio and a close range radio by UWB radio.

7. A wireless communication terminal, comprising:
a first case member;
a second case member;
a coupling portion that couples the first and second case members so that a positional relation between the first and second case members can be changed;
an external wireless communication antenna provided at the first case member;
an external wireless communication control portion that controls external wireless communication carried out through the external wireless communication antenna;
a first internal wireless communication antenna;
a first internal wireless communication control portion that controls internal wireless communication carried out through the first internal wireless communication antenna;
a display part provided at the second case member;
a second internal wireless communication antenna;
a second internal wireless communication control portion that controls internal wireless communication carried out through the second internal wireless communication antenna;
a communication environment detecting portion that detects a communication environment based on a signal received through the external wireless communication antenna;
a first output power control portion that controls output power of waves transmitted from the external wireless communication antenna based on the communication environment detected by the communication environment detecting portion; and
a second output power control portion that controls output power of waves transmitted from at least one of the first and second internal wireless communication antennas based on a result of control by the first output power control portion.

8. The wireless communication terminal according to claim 7, wherein:
the wireless communication terminal comprises a mobile telephone.

9. The wireless communication terminal according to claim 7, wherein:

the internal wireless communication is one of a very weak radio and a close range radio by UWB radio.

10. A mobile type wireless communication terminal having two case members coupled so that their relative position can be changed, the terminal comprising:

an internal wireless communication portion that transmits/receives data between the two case members; and an external wireless communication portion that wirelessly communicates with an external device in at least one of the two case members, a transmission power of the internal wireless communication carried out at a time of transmission by the external wireless communication portion to be larger than a transmission power of the internal wireless communication portion carried out at a receiving time by the external wireless communication portion.

* * * * *